United States Patent
Kim et al.

(10) Patent No.: US 7,283,815 B2
(45) Date of Patent: Oct. 16, 2007

(54) METHOD FOR MAXIMIZING GAIN OF RECEIVED SIGNAL IN A MULTIMEDIA BROADCAST/MULTICAST SERVICE SYSTEM

(75) Inventors: Jae-Hoon Kim, Seongnam-si (KR); Ki-Ho Cho, Seongnam-si (KR); Won-Seok Heo, Gunpo-si (KR); Byung-Jun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 11/079,091

(22) Filed: Mar. 15, 2005

(65) Prior Publication Data
US 2005/0201407 A1  Sep. 15, 2005

(30) Foreign Application Priority Data
Mar. 15, 2004  (KR) ...................... 10-2004-0017422

(51) Int. Cl.
*H04Q 7/20* (2006.01)
(52) U.S. Cl. ...................... 455/423; 455/442; 455/502; 455/560; 370/331; 729/223
(58) Field of Classification Search ................ 370/342, 370/331, 335, 432, 519, 328, 905; 455/502, 455/442–436, 423, 3.06, 560, 517, 525, 67.11
See application file for complete search history.

(56) References Cited

U.S. PATENT DOCUMENTS

| | | | |
|---|---|---|---|
| 5,481,258 A * | 1/1996 | Fawcett et al. ............. | 455/503 |
| 5,697,055 A * | 12/1997 | Gilhousen et al. .......... | 455/436 |
| 6,684,081 B2 | 1/2004 | Sarkkinen et al. | |
| 6,956,829 B2 * | 10/2005 | Lee et al. ................... | 370/342 |
| 7,031,694 B2 * | 4/2006 | Koulakiotis et al. ........ | 455/406 |
| 7,203,512 B2 * | 4/2007 | Jeong et al. ................. | 455/436 |
| 2003/0007471 A1 * | 1/2003 | Terasawa et al. ........... | 370/335 |
| 2003/0018773 A1 * | 1/2003 | Beckmann et al. ......... | 709/223 |
| 2003/0148774 A1 * | 8/2003 | Naghian et al. ............ | 455/456 |
| 2004/0008646 A1 | 1/2004 | Park et al. | |
| 2004/0014482 A1 * | 1/2004 | Kwak et al. ................. | 455/524 |
| 2004/0184487 A1 * | 9/2004 | Kim .......................... | 370/516 |

(Continued)

FOREIGN PATENT DOCUMENTS

EP    01376926 A1    1/2004

(Continued)

*Primary Examiner*—George Eng
*Assistant Examiner*—Kamran Afshar
(74) *Attorney, Agent, or Firm*—Roylance, Abrams, Berdo & Goodman, LLP

(57) ABSTRACT

A method for soft-combining MBMS (Multimedia Broadcast/Multicast Service) data in an asynchronous mobile communication system including a user equipment (UE) and a radio network controller (RNC), wherein the system provides an MBMS service. In the method, the RNC measures a round trip delay (RTD) for a primary cell in which the UE is located, and an RTD for each of the neighbor cells neighboring the primary cell. The RNC transmits the MBMS data at the same transmission time by considering the RTDs for the primary cell and the neighbor cells so that the UE can receive requested MBMS data. The UE receives MBMS data transmitted from the respective cells at the same transmission time, and performs soft combining on the received MBMS data.

6 Claims, 6 Drawing Sheets

U.S. PATENT DOCUMENTS

| | | | |
|---|---|---|---|
| 2004/0192308 A1* | 9/2004 | Lee et al. | 370/331 |
| 2004/0229624 A1* | 11/2004 | Cai et al. | 455/449 |
| 2005/0043035 A1* | 2/2005 | Diesen et al. | 455/403 |
| 2005/0063339 A1* | 3/2005 | Jeong et al. | 370/331 |
| 2005/0201366 A1* | 9/2005 | Kim et al. | 370/353 |

FOREIGN PATENT DOCUMENTS

| | | |
|---|---|---|
| KR | 10-2003-0096090 A | 12/2003 |
| WO | WO-03098842 A1 | 11/2003 |
| WO | WO-2004017540 A1 | 2/2004 |

* cited by examiner

METHOD FOR MAXIMIZING GAIN OF RECEIVED SIGNAL IN A MULTIMEDIA BROADCAST/MULTICAST SERVICE SYSTEM

CROSS-REFERENCE TO RELATED APPLICATIONS

This application claims the benefit under 35 U.S.C. §119(a) of Korean Patent Application No. 10-2004-0017422 entitled "Method For Maximizing Gain Of Received Signal In A Multimedia Broadcast/Multicast Service System" filed in the Korean Intellectual Property Office on Mar. 15, 2004, the entire disclosure of which is incorporated herein by reference.

BACKGROUND OF THE INVENTION

1. Field of the Invention

The present invention relates generally to a Multimedia Broadcast/Multicast Service (MBMS). In particular, the present invention relates to a method in which a radio network controller (RNC) transmits MBMS data by considering a transmission time for each of a primary cell and neighbor cells in order to provide an MBMS service.

2. Description of the Related Art

Today, in accordance with developments in the communication industry, a service provided in a Code Division Multiple Access (CDMA) mobile communication system is evolving from a voice service into a multicasting multimedia communication service that is capable of transmitting large-volume data, such as packet data and circuit data. To support the multicasting multimedia communication service, a Broadcast/Multicast Service in which a service is provided from one data source to a plurality of user equipment (UE) has been proposed. Such Broadcast/Multicast Service can be divided into a Cell Broadcast Service (CBS) which is a message-oriented service, and a Multimedia Broadcast/Multicast Service (MBMS) supporting multimedia data such as real-time image and voice, still image, text, and the like.

The MBMS service refers to a service for transmitting the same multimedia data to a plurality of UEs through a wireless network. The MBMS service allows the UEs to share one radio channel, thereby saving radio resources. The CBS service refers to a service for broadcasting a plurality of messages to all UEs located in a particular service area. The particular service area providing the CBS service may include the entire area where the CBS service is provided in one cell. The MBMS service, which is a service for providing both voice data and image data, requires a large quantity of transmission resources. The MBMS service is provided through a broadcasting channel (BCH), given that a large number of services can be simultaneously developed within one cell.

FIG. 1 is a diagram illustrating a timing relationship in a process of transmitting packet data in a synchronous mobile communication system.

Generally, a $3^{rd}$ generation (3G) mobile communication system uses a CDMA scheme. Standardization on the 3G CDMA mobile communication system is being separately carried out by the $3^{rd}$ Generation Partnership Project (3GPP) which is a European standardization organization, and the $3^{rd}$ Generation Partnership Project 2 (3GPP2) which is a US standard organization. The 3GPP system is called a Universal Mobile Telecommunication System (UMTS), in which, communication between the B Nodes is performed on an asynchronous basis. However, the 3GPP2 system is called a CDMA2000 system, in which, communication between base stations (or B Nodes) is achieved on a synchronous basis. A distinction between the synchronous system and the asynchronous system is made according to whether external synchronization time information is received from a Global Positioning Satellite (GPS) system to maintain synchronization.

In the synchronization system, all base stations use the same pseudo-random noise (PN) code, but each base station uses a PN code with a unique phase offset through phase delay. However, in the asynchronous system, all B Nodes (or base stations) use different PN codes for Node B identification.

FIG. 2 is a diagram illustrating cells performing soft combining in a general mobile communication system. In FIG. 2, a particular UE is located in a cell 201, and the cell 201 supports an MBMS service requested by the UE. The neighbor cells 202 and 203 of the cell 201 also provide the MBMS service requested by the UE. The cells 201, 202 and 203 can be defined as an active set of the UE. An RNC controlling a plurality of cells can define the cells 201, 202 and 203 as a soft combining region for reliability of MBMS data for the UE.

When the soft combining region (or group) A (that is, the region including the cells 201, 202 and 203) performs soft combining for an MBMS service, not only does the cell 201 of the UE transmit the same MBMS data frame for the same time, but also the neighbor cells 202 and 203. This is because each cell transmits an MBMS data stream to the UE located in the soft combining region according to external reference time information due to a characteristic of the synchronous system.

Referring to FIGS. 1 and 2, if the UE transmits an MBMS service request and then detects transmission of data for the MBMS service, an RNC receives MBMS data from a core network which comprises its upper system. The received MBMS data is delivered to a Node B (herein, being equal to a cell in terms of the concept) that manages a cell in which a UE that requested the MBMS service is located. Therefore, a Node B1 101 receives an MBMS data stream transmitted from the RNC which comprises its upper system, and stores the MBMS data stream in a buffer therein. It is assumed herein that a size of the received MBMS data stream is $P_1+P_2+P_3$, and that the buffer operates on a first-in first-out (FIFO) basis. A Node B2 102 also stores an MBMS data stream transmitted from the RNC in a buffer therein. A size of the MBMS data stream received at the Node B2 102 is $P_1+P_2$. Further, a Node B3 103 also stores an MBMS data stream received from the RNC in a buffer therein.

If a service notification for the MBMS service is received, each Node B starts transmitting the MBMS data to the UE at a service start time $T_0$. The Node B1 101 transmits the MBMS data at a start time $T_0=T_1$. The Node B2 102 transmits the MBMS data at a start time $T_0=T_2$. The Node B3 103 transmits the MBMS data at a start time $T_0=T_3$. That is, in the exemplary synchronous mobile communication system described above, MBMS data transmission start times of the B Nodes 101, 102 and 103 are fixed to $T_0=T_1$, $T_0=T_2$ and $T_0=T_3$, respectively, based on the external reference time information.

The UE receiving MBMS data from the cells performs soft combining on the received MBMS data, thereby guaranteeing reliability of the received data.

An asynchronous mobile communication system supporting an MBMS service requires the soft combining scheme for guaranteeing reliability of MBMS data for a UE.

However, the asynchronous mobile communication system supporting an MBMS service cannot acquire fixed transmission times using external reference time information. That is, as described above, because the asynchronous mobile communication system basically does not use external standard time information from the GPS system, each Node B thereof transmits a frame according to internal time information. Therefore, the asynchronous mobile communication system cannot support an MBMS soft combining scheme for transmitting MBMS data based on external reference time information.

Accordingly, a need exists for a system and method for transmitting the MBMS data at the same transmission time so that the UE can receive requested MBMS data.

SUMMARY OF THE INVENTION

It is, therefore, an object of the present invention to provide a method for increasing a reception gain of MBMS data for a UE in an asynchronous mobile communication system providing an MBMS service.

It is another object of the present invention to provide a method for performing soft combining in an asynchronous mobile communication system providing an MBMS service.

According to one aspect of the present invention, a method is provided for soft-combining MBMS (Multimedia Broadcast/Multicast Service) data in an asynchronous mobile communication system including a user equipment (UE) and a radio network controller (RNC), wherein the system provides an MBMS service. In the method, the RNC measures a round trip delay (RTD) for a primary cell in which the UE is located and an RTD for each of the neighbor cells neighboring the primary cell. The RNC transmits the MBMS data at the same transmission time by considering the RTDs for the primary cell and the neighbor cells, so that the UE can receive requested MBMS data. The UE receives the MBMS data transmitted from the respective cells at the same transmission time, and performs soft combining on the received MBMS data.

According to another aspect of the present invention, a method is provided for controlling transmission of a broadcast service by a radio network controller (RNC) in an asynchronous mobile communication system including a primary cell in which a user equipment (UE) is located, and the RNC providing a broadcast service requested by the UE to neighbor cells of the primary cell, the method including the steps of, upon detecting a start of the broadcast service from an upper system, determining whether the primary cell and the neighbor cells support soft combining, calculating a round trip delay (RTD) for each of the primary cell and the neighbor cells by transmitting a predetermined test frame to the respective cells before transmitting the broadcast service to the respective cells, and transmitting the broadcast service to the respective cells while using their calculated RTDs to determine a transmission time that is ahead of a reference time.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

A number of exemplary embodiments of the present invention will now be described in greater detail with reference to the annexed drawings. In the following description, a detailed description of known functions and configurations incorporated herein has been omitted for conciseness.

Embodiments of the present invention include a method in which a plurality of cells provide an MBMS service at the same transmission time in an asynchronous mobile communication system having no external reference time information. That is, in embodiments of the present invention, an RNC enables each cell in a soft combining region to correct an MBMS data frame transmission time of an MBMS service channel for soft combining, while maintaining time information (or clock information). Therefore, the cells in the soft combining region transmit MBMS data frames at the same transmission time, and a UE receiving the MBMS data frames performs soft combining on the received MBMS data frames, thereby guaranteeing reliability of the MBMS data.

Herein, the MBMS service refers to a service for transmitting the same multimedia data to a plurality of recipients through a wireless network. In this case, the recipients share one radio channel, thereby saving radio transmission resources. For example, the MBMS service includes a stock information service, sport broadcast service, Push-to-Talk (PTT) service, and the like.

Figure 1:
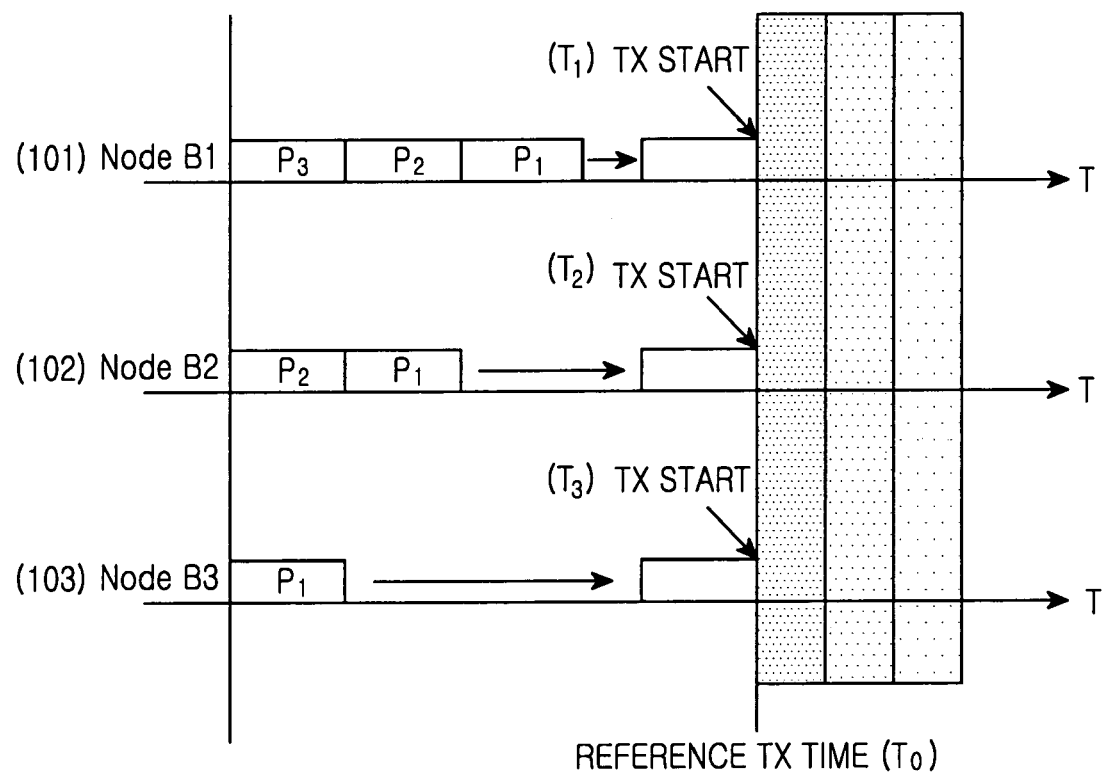
FIG. 1 is a diagram illustrating a timing relationship in a conventional process of transmitting packet data in a synchronous mobile communication system.
Figure 2:
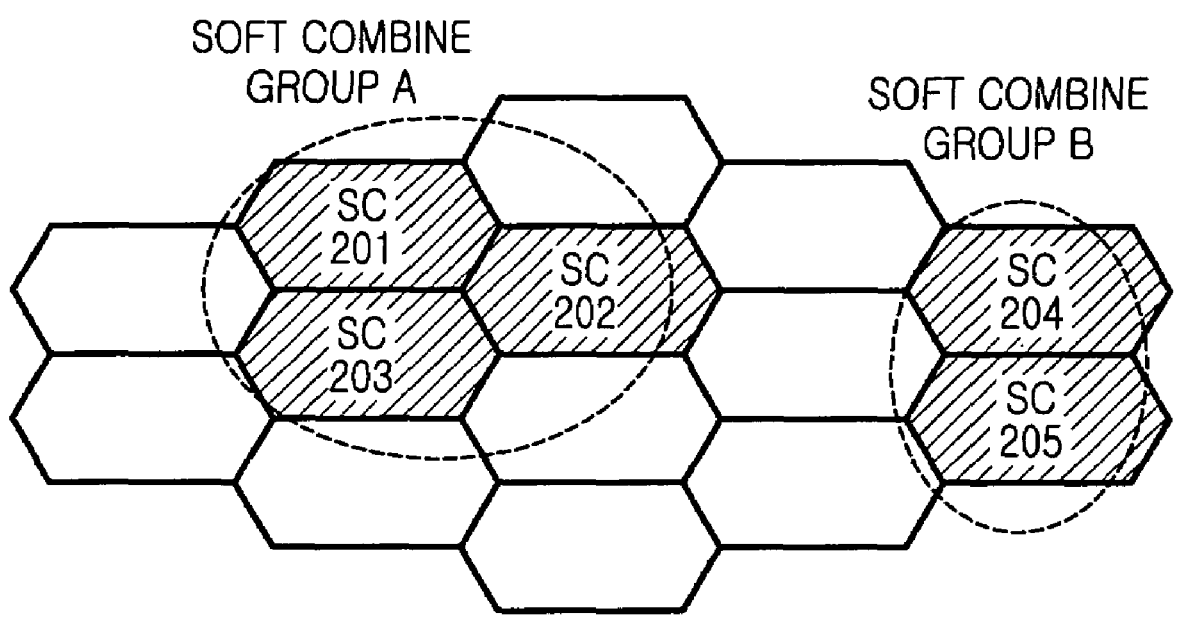
FIG. 2 is a diagram illustrating cells performing soft combining in a conventional mobile communication system.
Figure 3:
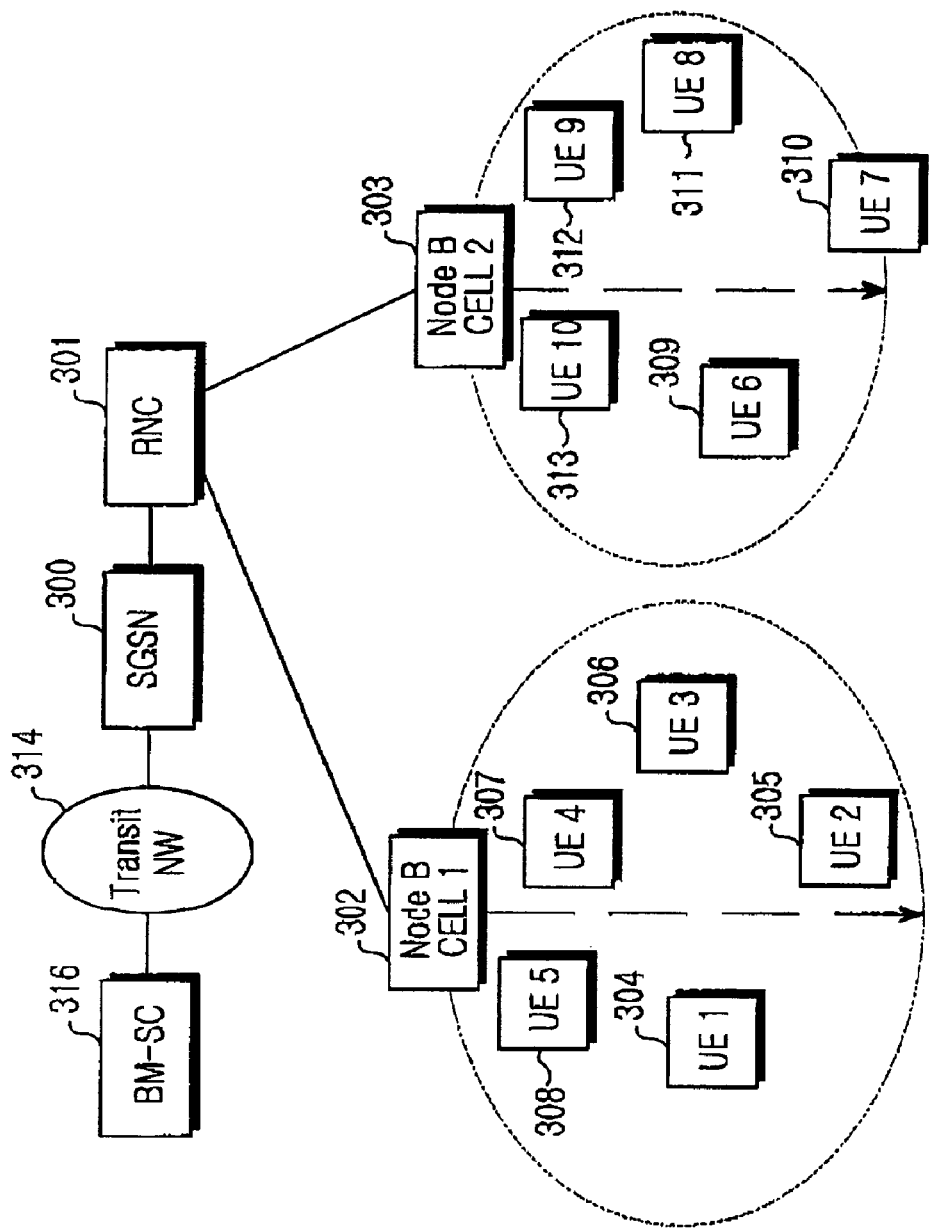
FIG. 3 is a diagram illustrating an exemplary architecture model of a mobile communication system for an MBMS service to which an embodiment of the present invention is applied.

FIG. 3 is a diagram illustrating a simplified exemplary architecture model of a mobile communication system for an MBMS service in accordance with an embodiment of the present invention. For example, FIG. 3 illustrates the architecture of a 3GPP system which is a standard asynchronous 3G mobile communication system for an MBMS service.

Referring to FIG. 3, UEs 304, 305, 306, 307 and 308 represent UEs, or subscribers, that are capable of receiving an MBMS service and which are located in a cell#1 302, and UEs 309, 310, 311, 312 and 313 represent UEs or subscribers, that are capable of receiving an MBMS service and which are located in a cell#2 303. The cell#1 302 and the cell#2 303 represent Node B devices, which transmit MBMS data to their UEs. As illustrated, only one radio channel for an MBMS service is formed between the cell#1 302 and its UEs 304, 305, 306, 307 and 308. An RNC 301 representing a wireless network controller for controlling a plurality of cells, selectively transmits multimedia data to a particular cell, and controls a radio channel set up for providing an MBMS service. The cell#1 302 and the cell#2 303 receive the same MBMS data from the RNC 301, and provide the MBMS data to their UE groups (304, 305, 306, 307 and 308) and (309, 310, 311, 312 and 313), respectively.

A Serving GPRS (General Packet Radio Service) Support Node (SGSN) 300 controls an MBMS service for each UE. Typically, the SGSN 300 includes a function for managing service accounting data for each subscriber, and a function for selectively transmitting multimedia data to a particular RNC. A transit network 314 provides a communication path between a Broadcast/Multicast Service Center (BM-SC) 316 and the SGSN 300, and can be comprised of a Gateway GPRS Support Node ((GGSN), not shown) and an external network. The BM-SC 316 is a source of MBMS data and manages data scheduling for each service.

An MBMS data stream is delivered to the UE groups (304, 305, 306, 307, and 308) and (309, 310, 311, 312 and 313) via the transit network 314, the SGSN 300, the RNC 301 and the cells 302 and 303. Although not illustrated in FIG. 3, a plurality of SGSNs can be used for one MBMS service, and a plurality of RNCs can be connected to each SGSN. In this case, each SGSN should selectively transmit MBMS data to the RNCs, and each RNC should also selectively transmit MBMS data to the cells. To this end, the SGSN stores a list of target RNCs to which it should transmit the MBMS data stream, and the RNC stores a list of target cells to which it should transmit the MBMS data stream. Thereafter, the SGSN and the RNC selectively transmit the MBMS data to the target RNCs and the target cells stored in the RNC list and the cell list, respectively.

Figure 4:
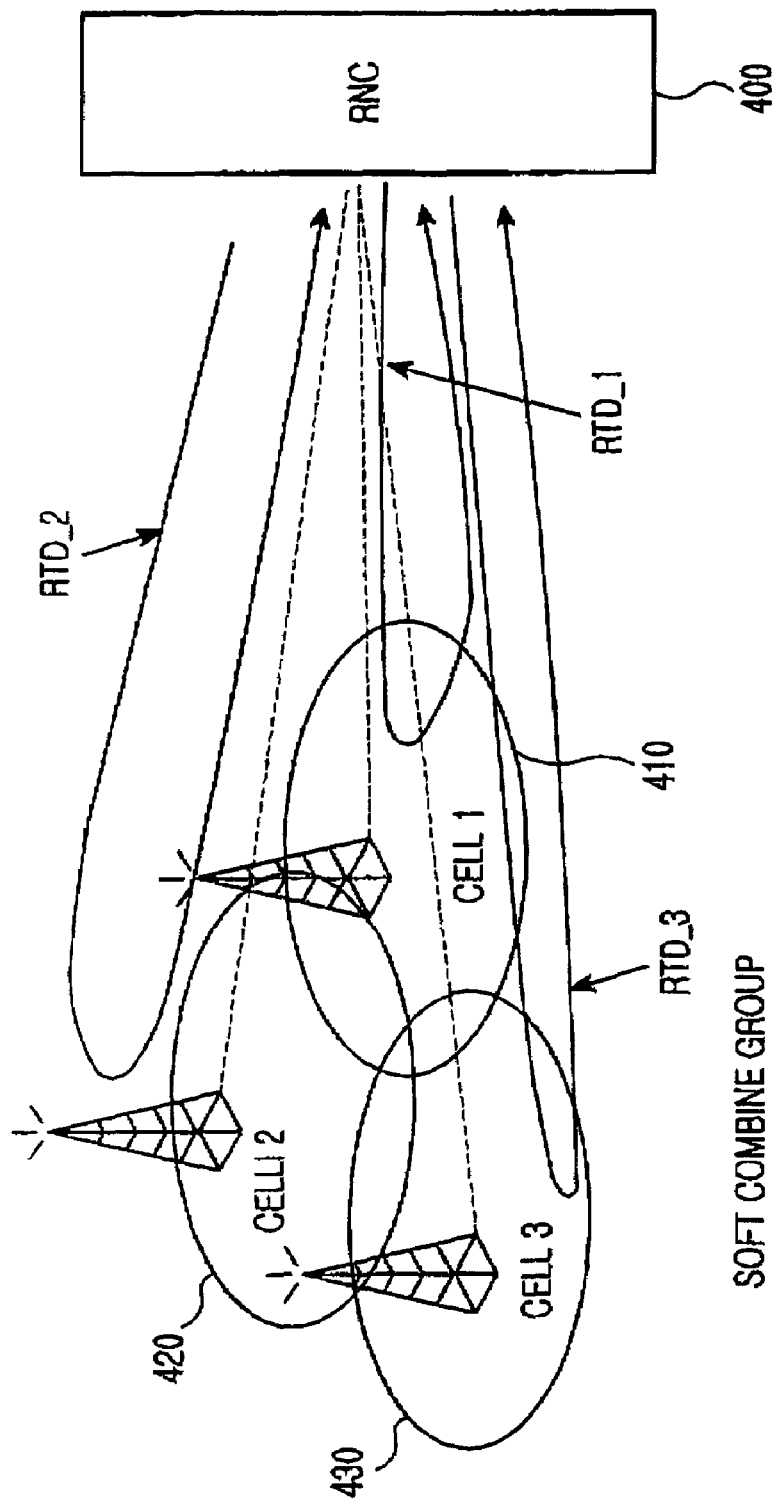
FIG. 4 is a diagram illustrating an exemplary process of performing soft combining by considering a round trip delay (RTD) for each cell according to an embodiment of the present invention.

FIG. 4 is a diagram illustrating an exemplary process of performing soft combining by considering a round trip delay (RTD) for each cell according to an embodiment of the present invention. Referring to FIG. 4, an RNC 400 transmits an MBMS data stream to cells 410, 420 and 430 in which a UE that is requesting a particular MBMS service is located. For reliability of the MBMS data, the UE can define the cells 410, 420 and 430 as a soft combining group. In this case, the RNC 400 transmits a test frame for correction of a frame transmission time to cell#1 410, cell#2 420 and cell#3 430, before transmission of the MBMS data.

That is, the RNC 400 distinguishes cell#1 410, cell#2 420 and cell#3 430 performing soft combining among its cells, and transmits a test frame to cell#1 410, cell#2 420 and cell#3 430 to measure an RTD for each of the cells. The RTD represents a data transmission delay based on location information of each cell in a mobile communication system, and cell#1 410, cell#2 420 and cell#3 430 have different RTDs.

For example, if cell#1 410 is located within the shortest distance from the RNC 400, an RTD_1 for cell#1 410 has the least value. If cell#3 430 is located at the longest distance from the RNC 400, an RTD_3 for cell#3 430 has the largest value.

Figure 5:
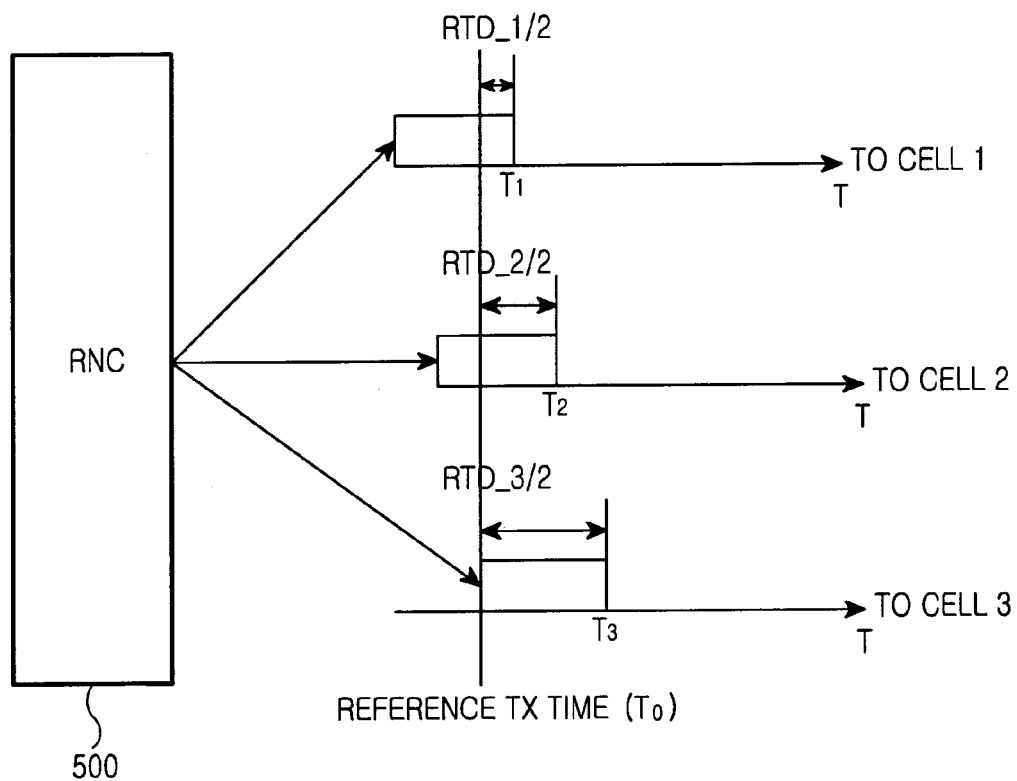
FIG. 5 is a diagram illustrating an exemplary timing relationship in a process of transmitting MBMS data by considering an RTD for each cell according to an embodiment of the present invention.

FIG. 5 is a diagram illustrating a timing relationship in a process of transmitting MBMS data by considering an RTD for each cell according to an embodiment of the present invention. Referring to FIG. 5, an RNC 500 allows a cell#1 to transmit an MBMS data frame to a UE requesting an MBMS service at a time $T_1$ ahead of an MBMS data transmission start time $T_0$. That is, cell#1 (such as 410 of FIG. 4) is a cell having an RTD_1/2 which is used to determine a delay from the MBMS data transmission start time $T_0$ (or a transmission start time based on external reference time information) by 1/2, and the RNC 500 allows cell#1 to transmit the MBMS data at the RTD_1/2 time ahead of the MBMS data transmission start time $T_0$ thereby taking into consideration the data transmission delay RTD_1/2. Accordingly, the cell#1 transmits the MBMS data at the MBMS data transmission start time $T_0$.

Similarly, the RNC 500 allows cell#2 (such as 420 of FIG. 4) to transmit an MBMS data frame at a time $T_2$ ahead of the MBMS data transmission start time $T_0$. That is, cell#2 is a cell having an RTD_2/2 which is used to determine a delay from the MBMS data transmission start time $T_0$ by 2/2, and the RNC 500 allows cell#2 to transmit the MBMS data at the RTD_2/2 time ahead of the MBMS data transmission start time $T_0$. Accordingly, cell#2 transmits the MBMS data at the MBMS data transmission start time $T_0$.

Finally, the RNC 500 allows cell#3 (such as 430 of FIG. 4) to transmit an MBMS data frame at a time $T_3$ ahead of the MBMS data transmission start time To. That is, cell#3 is a cell having an RTD_3/2 which is used to determine a delay from the MBMS data transmission start time $T_0$ by 3/2, and the RNC 500 allows cell#3 to transmit the MBMS data at the RTD_3/2 time ahead of the MBMS data transmission start time $T_0$. Accordingly, cell#3 transmits the MBMS data at the MBMS data transmission start time $T_0$.

As described above, the RNC 500 enables each cell to transmit an MBMS data by considering a difference between the external reference time and its RTD, that is, at a start time of the requested MBMS service, instead of enabling each cell to transmit the MBMS data frame according to Node-B Frame Number (BFN) information which is its own unique time information.

Figure 6:
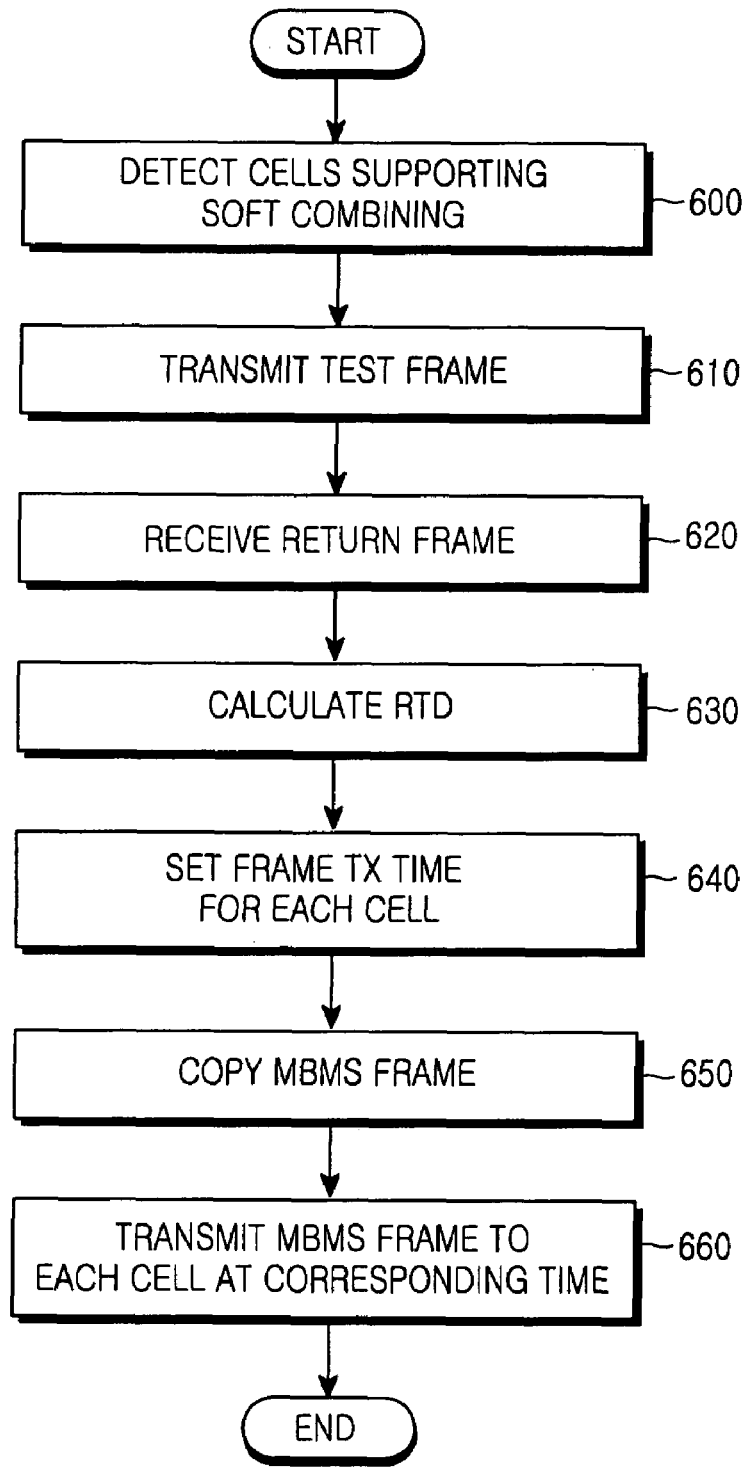
FIG. 6 is a flowchart illustrating a procedure for transmitting MBMS data to each cell by an RNC according to an embodiment of the present invention.

FIG. 6 is a flowchart illustrating a procedure for transmitting packet data to each cell by an RNC according to an embodiment of the present invention. Referring to FIG. 6, in step 600, an RNC distinguishes cells supporting soft combining in their areas. If a cell of a UE requesting a particular MBMS service and its neighbor cells support soft combining, the RNC transmits a test frame to each of the cells supporting soft combining in step 610, and receives a response signal (or a return frame) for the test frame in step 620. In step 630, the RNC calculates an RTD for each cell according to the response signal. In step 640, the RNC determines a transmission start time for each cell based on the calculated RTD. In step 650, the RNC copies an MBMS data frame as many times as the number of cells performing soft combining. Thereafter, in step 660, the RNC transmits the copied MBMS data frames to the corresponding cells by considering their RTDs.

That is, the cells that have received an MBMS data frame from the RNC, simultaneously transmit the MBMS data frame at a start time (reference start time) of the MBMS service required by the UE.

Herein, the MBMS service transmits an MBMS data frame using a separate MBMS-only channel, and is differentiated from the existing circuit service. That is, because the MBMS service is out of sync with the existing channel, it is difficult for the UE to detect a frame start point and a slot start point of an MBMS channel. Therefore, the cells receiving RTD values from the RNC transmit the RTD values using a broadcasting channel (BCH). The RTD values are included in a particular field of the BCH, and are expressed with chip-based values so that they should be distinguished from the existing frame sync. Then the UE receiving the RTD values from the cells, determines a frame start point and a slot start point for its desired MBMS service, and receives the MBMS data at the corresponding time.

Because a frame start point and a slot start point of an MBMS frame from one cell are equal to a frame start point and a slot start point of an MBMS frame from another cell in the soft combining scheme, the UE receives MBMS channels from a plurality of cells and combines the received MBMS channels. In this way, the UE can increase a reception gain of an MBMS channel and decrease an error rate.

As described above, in an asynchronous mobile communication system using no external reference time information, an RNC adjusts a frame start point by considering RTD information of each cell to perform soft combining on MBMS data from different cells at the same time. Therefore, in the asynchronous mobile communication system supporting an MBMS service, a UE receives the same MBMS data from a plurality of cells at the same time and performs soft combining on the received MBMS data, thereby increasing Quality of Service (QoS).

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for providing MBMS (Multimedia Broadcast/Multicast Service) data in an asynchronous mobile communication system, the method comprising the steps of:
   measuring, by a radio network controller (RNC), a round trip delay (RTD) of a primary cell in which user equipment (UE) is located and each RTD of at least one neighbor cell;
   transmitting the MBMS data to the primary cell and each neighbor cell by considering the each measured RTD of the primary cell and the neighbor cells;
   receiving, by the UE, the MBMS data from the primary cell and each neighbor cell at the same time, and performing soft combining on the received MBMS data;
   wherein the measuring, by the RNC, of the RTDs of the primary cell and each neighbor cell comprises transmitting a predetermined test frame and receiving response signals for the test frame; and
   copying the MBMS data according to the number of the primary cell and the neighbor cells and transmitting, by the RNC, the copied MBMS data to the primary cell and each neighbor cell.

2. The method of claim 1, wherein:
   the transmitting, by the RNC, of the MBMS data to the primary cell and each neighbor cell is at different transmission time based on the RTDs of the primary cell and each neighbor cell ahead of a reference time when the UE receives the MBMS data.

3. The method of claim 2, further comprising the steps of:
   receiving, by the primary cell and each neighbor cell, the MBMS data from the RNC;
   detecting the transmission time of the MBMS data based on the RTDs of the primary cell and each neighbor cell determined by the received MBMS data; and
   transmitting a broadcasting channel including the RTDs of the primary cell and each neighbor cell to the UE.

4. A method for transmitting MBMS (Multimedia Broadcast/Multicast Service) data by a radio network controller (RNC) in an asynchronous mobile communication system, the method comprising the steps of:
   detecting a start of the MBMS service from an upper system;
   determining whether a primary cell in which user equipment (UE) is located and at least one neighbor cell support soft combining;
   measuring round trip delays (RTD)s of the primary cell and each neighbor cell by transmitting a predetermined test frame before transmitting the data of the MBMS service if the primary cell and each neighbor cell support soft combining; and
   transmitting, by the RNC, the MBMS data to the primary cell and each neighbor cell at different transmission time based on the RTDs of the primary cell and each neighbor cell ahead of a reference time;
   wherein the measuring, by the RNC, of the RTDs of the primary cell and each neighbor cell comprises transmitting a predetermined test frame and receiving response signals for the test frame; and
   copying the MBMS data according to the number of the primary cell and the neighbor cells and transmitting, by the RNC, the copied MBMS data to the primary cell and each neighbor cell.

5. A system for providing MBMS (Multimedia Broadcast/Multicast Service) data in asynchronous mobile communication, the system comprising:
   a radio network controller (RNC), which is configured to measure a round trip delay (RTD) of a primary cell in which user equipment (UE) is located and each RTD of at least one neighbor cell, and to transmit the MBMS data to the primary cell and each neighbor cell based on the each measured RTD of the primary cell and each of the neighbor cells;
   user eguipment (UE), which is configured to receive a plurality of broadcasting channels includes the RTDs of the primary cell and each of the neighbor cells and receives MBMS data from the primary cell and each of the neighbor cells at the same time and performs soft combining on the received MBMS data:
   wherein the RNC is configured to measure the RTDs of the primary cell and each neighbor cell by transmitting a test frame and receiving response signals for the test frame; and
   the RNC is configured to copy the MBMS data for the number of the primary cell and the neighbor cells.

6. The system of claim 5, wherein the RNC is further configured to transmit the MBMS data to the primary cell and each neighbor cell at different transmission time based on the RTDs of the primary cell and each neighbor cell ahead of a reference time when the UE receives the MBMS data.

* * * * *